United States Patent [19]

Ito

[11] Patent Number: 4,721,178
[45] Date of Patent: Jan. 26, 1988

[54] MULTI-WHEELED VEHICLE

[75] Inventor: Norihiko Ito, Saitama, Japan

[73] Assignee: Honda Giken Kogyo Kabushiki Kaisha, Tokyo, Japan

[21] Appl. No.: 894,246

[22] Filed: Aug. 8, 1986

[30] Foreign Application Priority Data

Aug. 8, 1985 [JP] Japan .................................. 60-173102
Oct. 5, 1985 [JP] Japan .................................. 60-222175
Apr. 10, 1986 [JP] Japan .................................. 61-81139

[51] Int. Cl.⁴ .................................................. B62J 35/00
[52] U.S. Cl. .................................. 180/215; 180/219; 280/5 A
[58] Field of Search ............... 180/219, 225, 229, 230, 180/215; 280/5 A, 5 R

[56] References Cited

U.S. PATENT DOCUMENTS

| 2,271,805 | 2/1942 | Salsbury | 180/219 |
| 4,340,125 | 7/1982 | Wanatabe et al. | 180/215 |
| 4,506,754 | 3/1985 | Hirano et al. | 180/219 |
| 4,520,891 | 6/1985 | Omholt | 180/219 |

Primary Examiner—John A. Pekar
Attorney, Agent, or Firm—Lyon & Lyon

[57] ABSTRACT

The present invention provides a multi-wheeled vehicle of the motorcycle or motor scooter type including having a vehicle body including a front cover, a rear cover and a low-slung footrest portion which extends beneath the line connecting the front and rear axle of the vehicle. The vehicle is provided with a tandem seat which is positioned downwardly and forwardly so as to provide improved weight distribution between the front and rear wheels such that the front of the seat is forward or downward of a tangent line connecting a grip of the steering mechanism and the front circumferential face of the rear wheel. The vehicle body includes a frame having two lower members and one upper member arranged at the apices of a triangle and, in a preferred embodiment, at the apices of an isosceles triangle. A fuel tank is provided in the protected space between the body members and various metal flange members such that the tank is substantially arranged at the same level as the power unit and the lower surface of the tank may also be below the level of the front and rear axles. The passenger seat is arranged so as to be on the front side of a vertical line passing through the rear axle of the vehicle. This construction provides greater torsional and flexture vehicle frame stability. Additionally, a convenient kick stand is provided for maintaining the vehicle when not in use which does not decrease the overall appearance of the vehicle.

6 Claims, 14 Drawing Figures

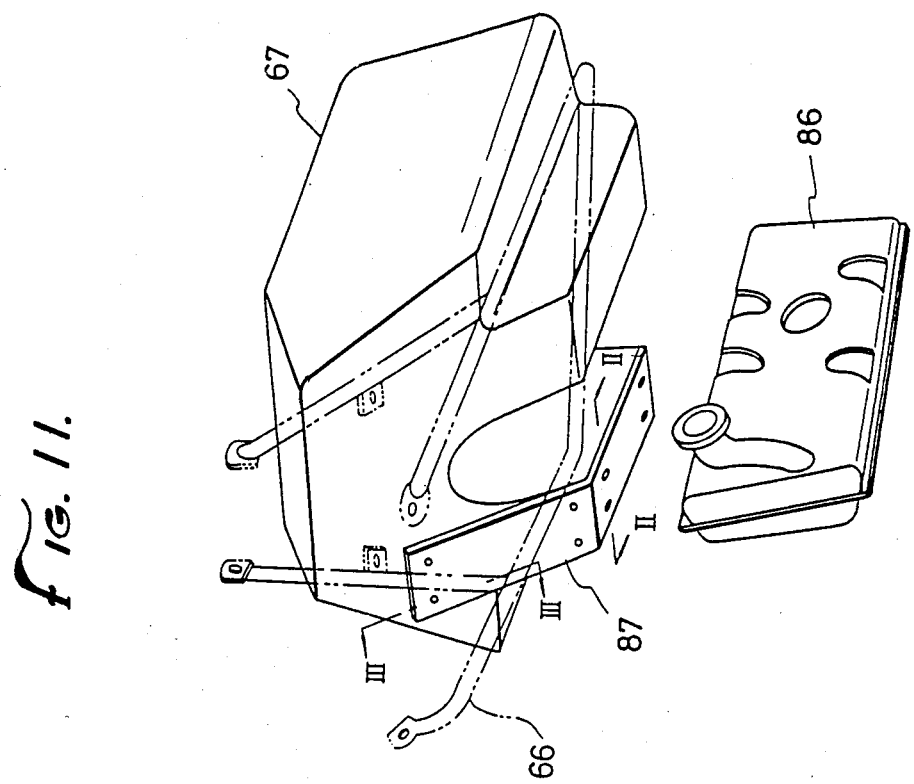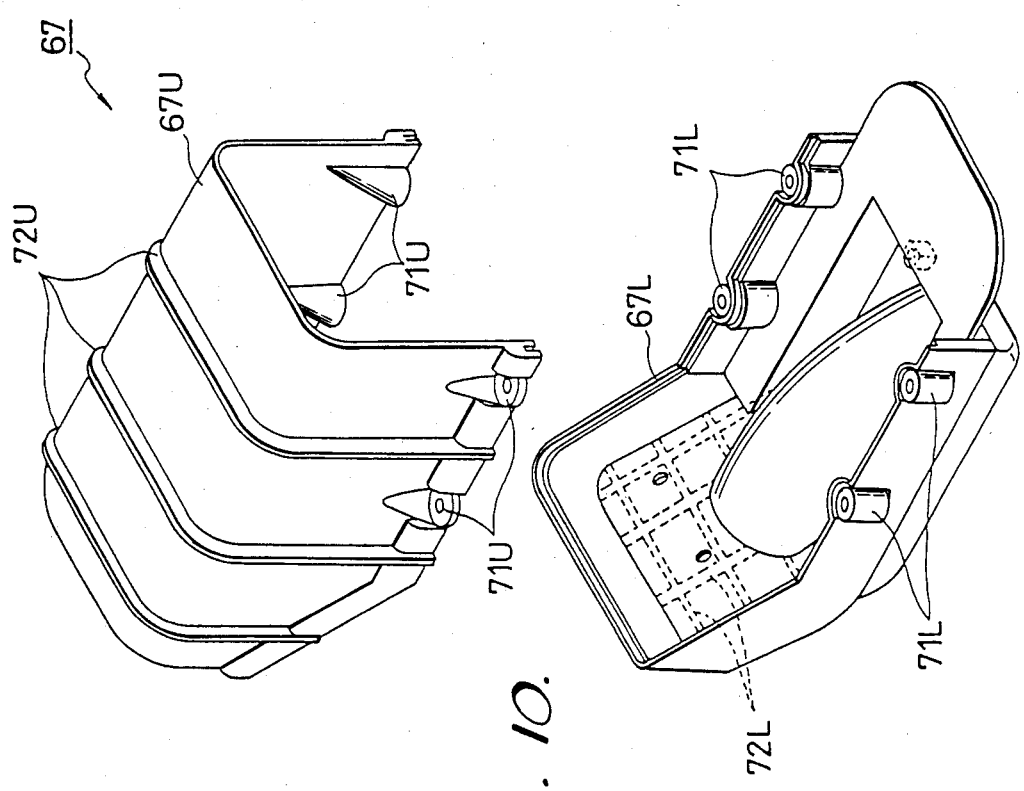

MULTI-WHEELED VEHICLE

BACKGROUND

The field of the invention is multi-wheeled vehicles and, in partricular, multi-wheeled vehicles of the motorcycle or motor scooter type.

In a multi-wheeled vehicle of the motorcycle or motor scooter type it is possible to have a low-slung footrest portion between the front and rear wheels. Such a configuration provides a footrest which extends below a line which connects the front and rear axle of the motor scooter. Typically, the seat on such a motorcycle or motor scooter is located so that the rider may place his or her feet on footrest plates provided on the low-slung footrest portion during riding.

As the distance between the front and rear wheels of such a vehicle is elongated, several problems may develop. For example, as such distance is elongated, the center of gravity of the vehicle is lowered. Typically, the seat position on such vehicles is also shifted rearward so as to enlarge the area on the footrest plates. However, as the seat position is shifted to the rear portion of the body, the vehicle center of gravity during riding is offset to the rear wheel side of the vehicle, thereby changing the desired weight distribution between the front and rear wheels of the vehicle. Moreover, such unequal and fluctuating weight distribution limits the positioning of the remaining vehicle parts. In addition, where a tandem seat for a driver and a rear rider is provided, the construction of the vehicle is further limited in view of the further rearward position of the vehicle center of gravity.

Moreover, by extending the distance between the front and rear axles of such a vehicle, it is important to provide sufficient vehicle frame rigidity and stability. Thus, when the body is elongated it is typically necessary to increase the size of the structural frame members, thereby greatly increasing the weight of the vehicle.

It is also desirable to provide a retractable swingable stand so as to maintain the vehicle in the upright condition when not in use. However, such retractable swingable stands are difficult to use in view of the vehicle cover extending about the various portions of the motorcycle or motor-scooter or significantly diminish the appearance of the vehicle. This is especially true since such stands must be located so as to not obstruct the rider during operation of the vehicle and, preferably, so as to not damage the overall appearance of the vehicle.

SUMMARY OF THE INVENTION

In order to overcome the problems associated with the prior art, the present invention provides a body frame for supporting a footrest plate positioned at a low-slung footrest position below a line connecting the front and rear axles. The vehicle seat is located in such a manner that the front end portion of the seat is positioned over the foot plates and at a position below or in front of a tangent line connecting a grip of the front wheel steering handle with the front circumferential surface of the vehicle rear wheel as viewed in the side elevation. In addition, the present invention provides a main body frame having left and right lower main frame members and an upper main frame member. The frame members are positioned at the apicies of a triangle and, in the preferred embodiment, at the apicies of an isosceles triangle. Rigid members are connected to the upper and lower main frame members so as to fixedly secure the relative position of each. A foot-operated retractable swingable main stand is provided wherein the foot operating pedal of the stand is located at a position inside the outer edge of the rear cover when the main stand is in the retracted position.

As such, it is an object of the present invention to provide a multi-wheeled vehicle of the motorcycle or motor scooter type wherein the center of gravity of the body is lowered so as to reduce the fluctuation of weight distribution between the front and rear wheels during riding.

It is a further object of the present invention to provide a multi-wheeled vehicle of the motorcycle or scooter type with a lower center of gravity where the freedom to selectively position various components is preserved.

It is a further object of the present invention to provide a multi-wheeled vehicle body frame of a motorcycle or motor-scooter type wherein the distance between the front and rear axles may be elongated without substantially increasing the size of the body frame members.

It is a further object of the present invention to provide a mutli-wheeled vehicle of the motorcycle or motorscooter type wherein the pedal for operating a retractable swingable main stand is located in such a position as to not obstruct the rider and so as to not damage the vehicle's appearance. Other and more detailed objects of the present invention will become apparent to those skilled in the art upon examination of the disclosure contained herein.

BRIEF DESCRIPTION OF THE DRAWINGS

The preferred embodiment of the present invention will hereinafter be described with reference to the accompanying drawings, wherein:

FIG. 10 is an exploded perspective view of the rear trunk of the present invention;

FIG. 11 is a perspective view showing the positional relationship between the rear trunk and the muffler shown from the oblique down side;

DETAILED DESCRIPTION OF THE PREFERRED EMBODIMENT

Figure 14:
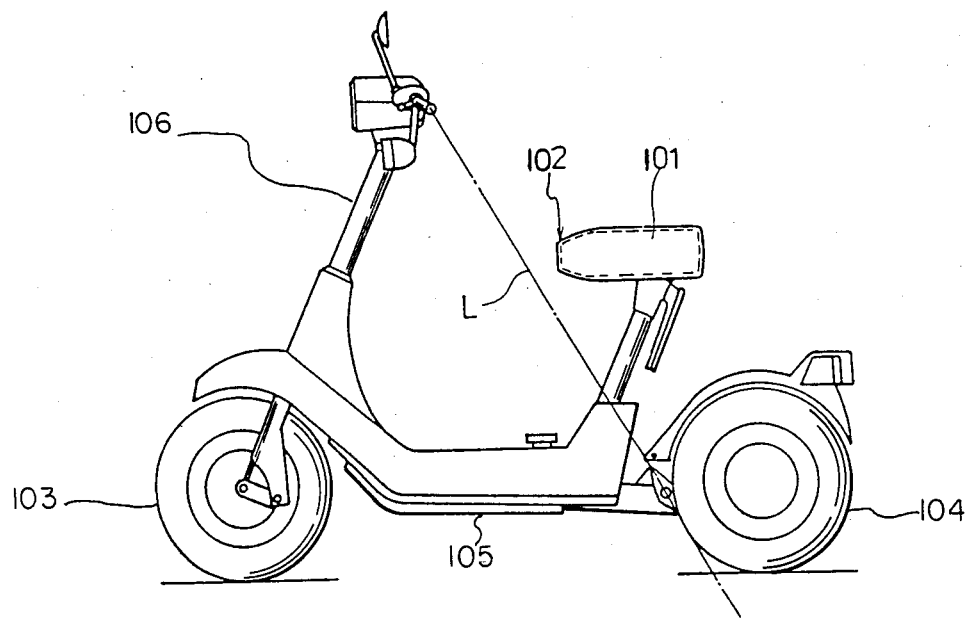
FIG. 14 is a side view of a multi-wheeled vehicle of the described type according to the prior art.

As shown in FIG. 14, the typical prior art multi-wheeled vehicle of the motorcycle or motor scooter type includes a front and a rear wheel, 103 and 104, respectively, a body 105, a steering apparatus 106 and a seat 101. The height of the seat 101 is such that the front end portion 102 of the seat 101 is positioned on the upper or rearward side of a straight line L connecting a grip of the front wheel steering mechanism 106 and a front circumferential surface of the rear wheel 104 as viewed in a side elevation. Such positioning of the components is acceptable so long as the distance between the front and rear axles is limited.

Figure 1:
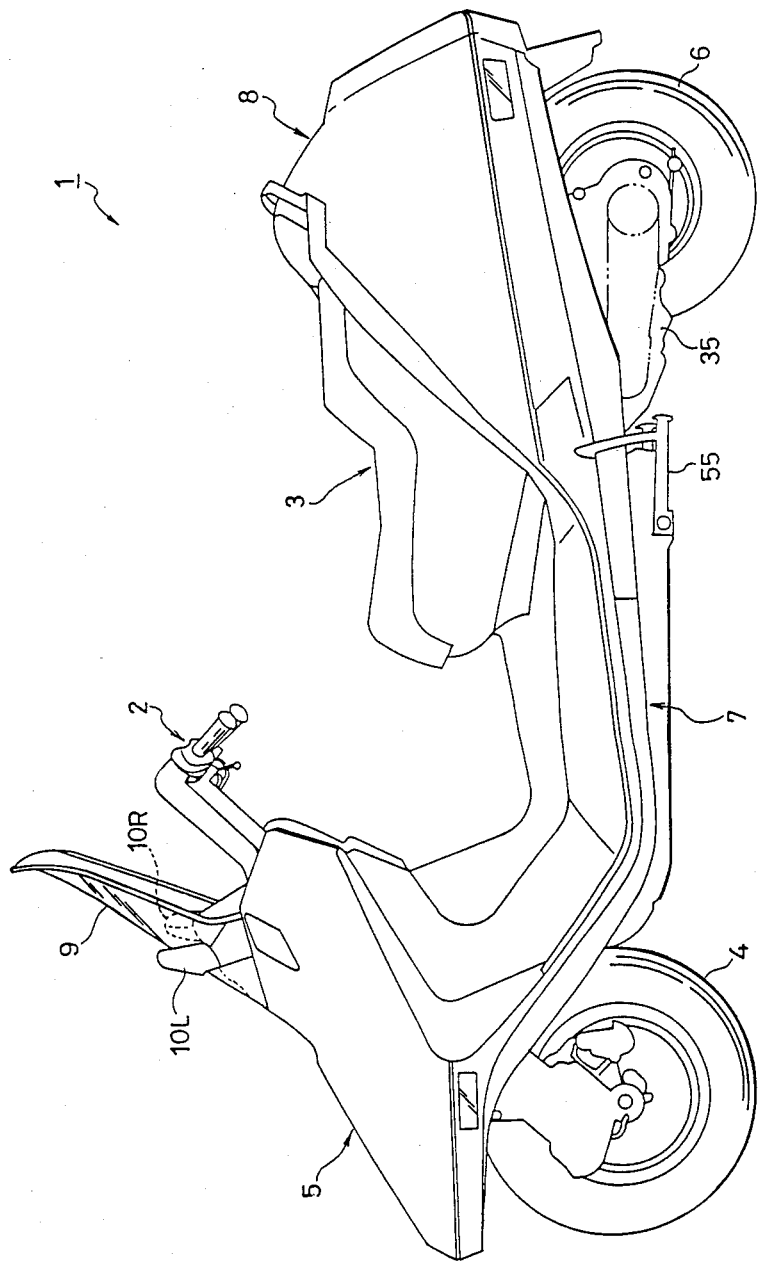
FIG. 1 is a side view of a multi-wheeled vehicle according to the present invention.

Referring to FIG. 1, a scooter type vehicle 1 according to the present invention has a body structure of a so-called American type such that a handle 2 is provided at a high position, and a seat 3 is provided at a lower position. A wheel base of the vehicle 1 is much longer than that of a conventional motorcycle. The seat 3 is a so-called V-shaped seat of an integral type having a rider seat and a tandem passenger seat. A leg shield having an acute shape a viewed in side elevation is provided over a front wheel 4 mounted on a front axle 4a. A low-slung step floor 7 is connected to the leg shield 5 and is arranged between the front wheel 4 and a rear wheel 6, mounted on a rear axle 6a.

A rear cover 8 is connected with the step floor 7 and covers an upper side of the rear wheel 6. The rear cover 8 has a slant front edge extending along a rear edge of the V-shaped seat 3. Thus, a body cover is constituted of the leg shield 5, the step floor 7 and the rear cover 8. A windshield 9 is provided over the leg shield 5 on a front side of the handle 2. Side mirrors 10L and 10R are mounted to left and right sides of the windshield 9.

Figure 2:
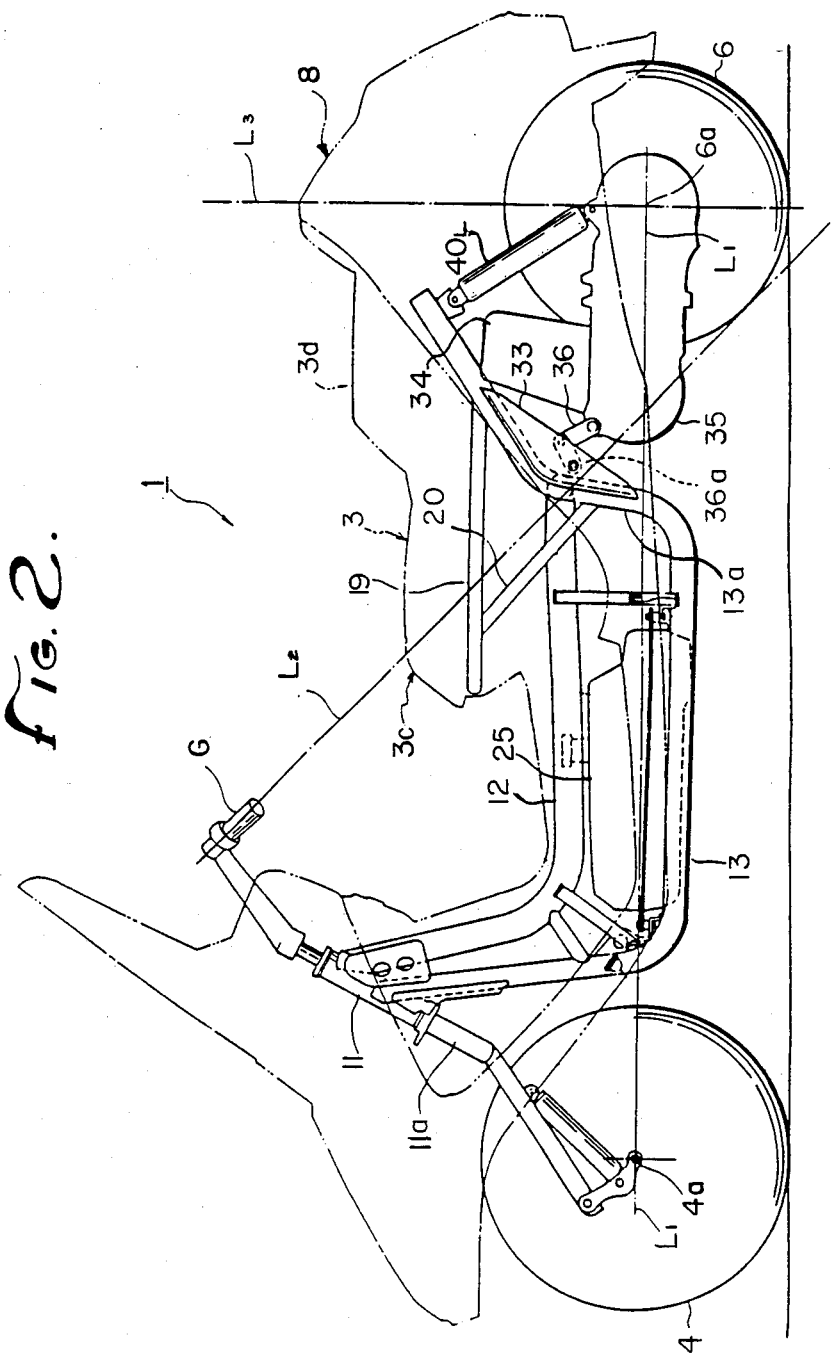
FIG. 2 is a partial cross-sectional left side view of a multi-wheeled vehicle according to the present invention.

Referring to FIG. 2, a vehicle body frame including a head pipe 11, a main pipe 12 and a pair of down pipes 13L and 13R is provided. The main pipe 12 extends obliquely downwardly from the head pipe 11. The main pipe 12 further extends horizontally from an upper rear side of the front wheel 4 to a rear portion of the vehicle body. As illustrated in the figures, the main pipe 12 extends substantially along the centerline of the vehicle body.

Figure 3:
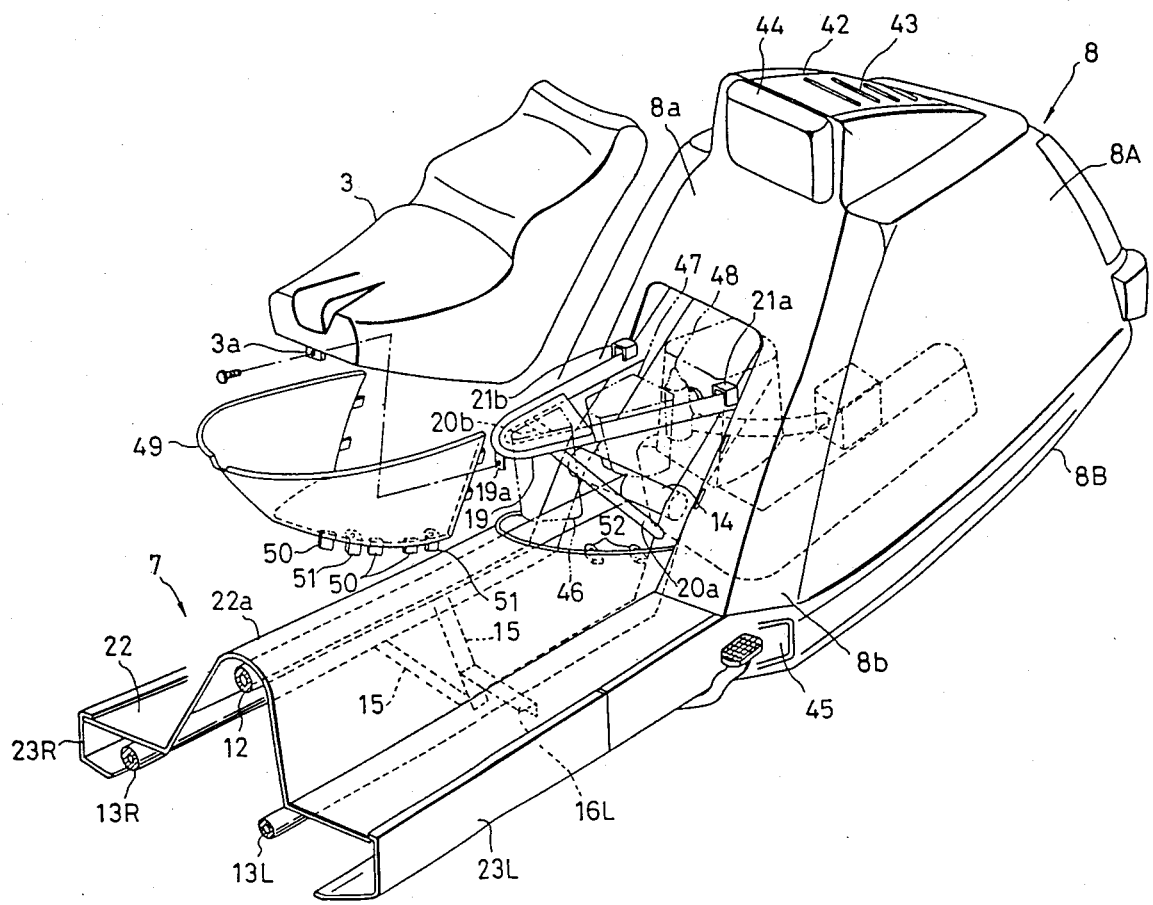
FIG. 3 is an exploded perspecive view of the seat portion of a multi-wheeled vehicle.
Figure 4:
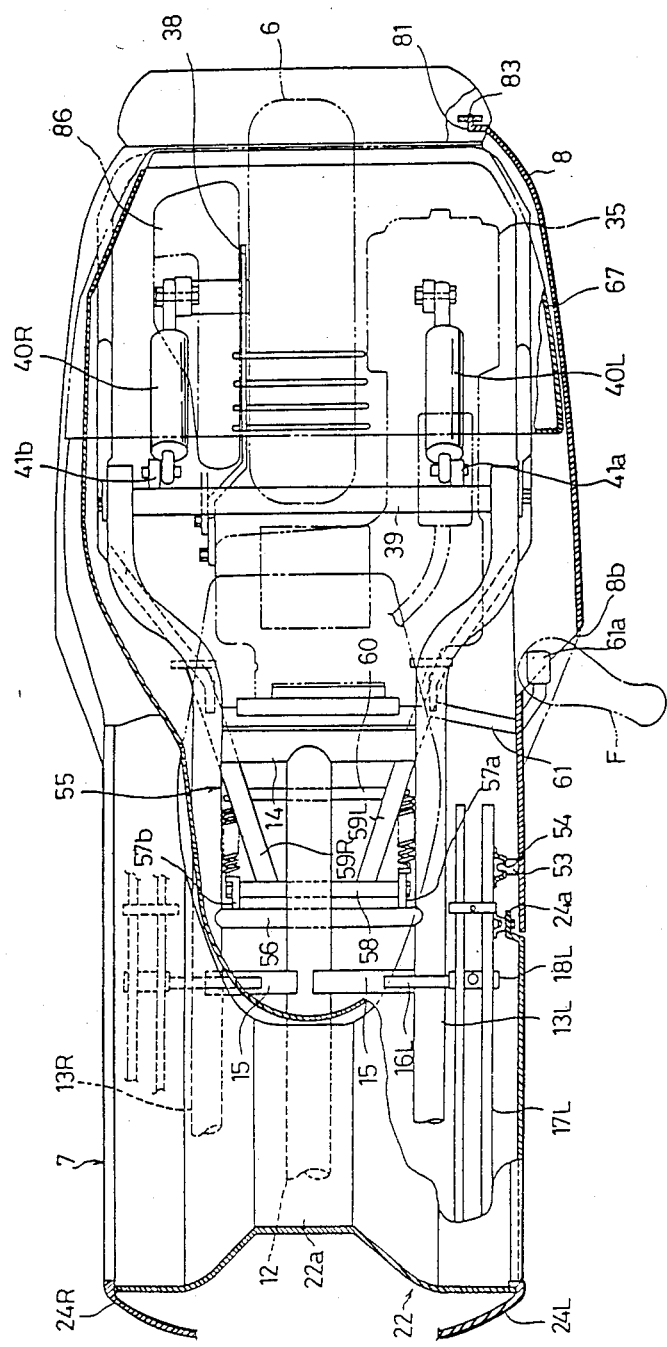
FIG. 4 is broken plan view of the rear portion of a body of a multi-wheeled vehicle according to the present invention.

The pair of down pipes 13L and 13R extend obliquely downwardly from the head pipe 11 to a position lower than the main pipe 12, and further extend in parallel to each other to the rear portion of the vehicle body. At the rear of the vehicle body, the down pipes 13L and 13R rise substantially upright, and further extend obliquely upwardly to a further rear portion of the body. As shown in FIGS. 3 and 4, a cross member 14 is fixed between the upright rising portions 13a of the down pipes 13L and 13R and is connected at its intermediate portion to the rear end of the main pipe 12.

Figure 5:
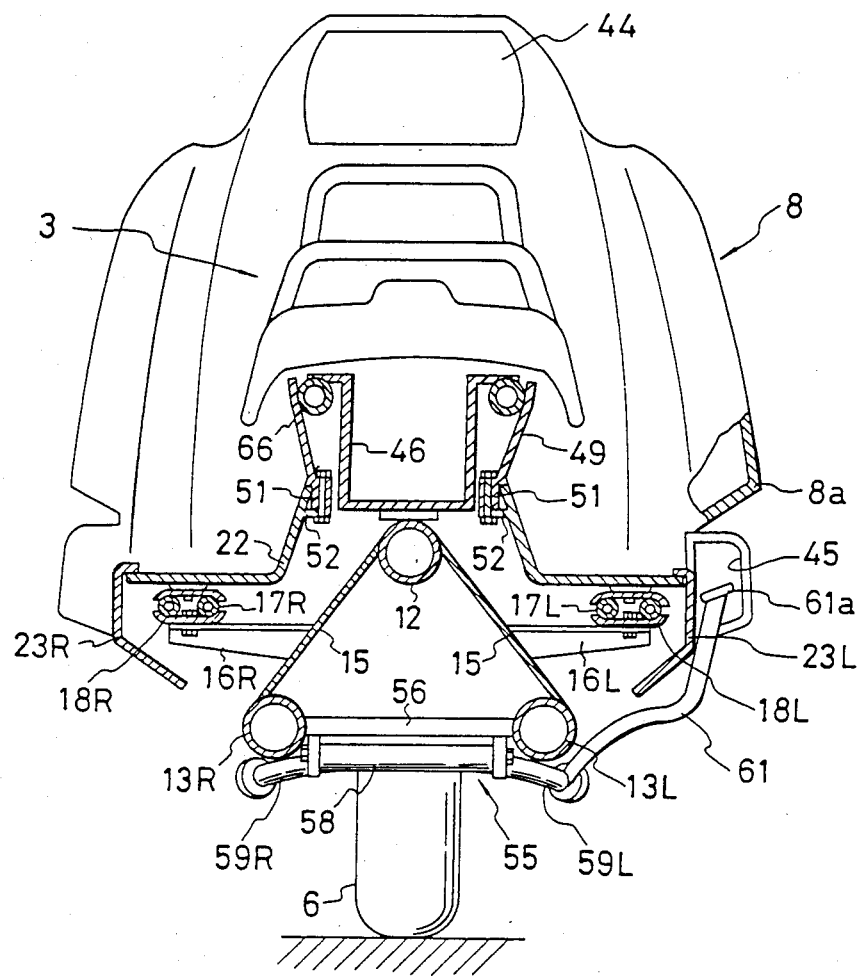
FIG. 5 is a front elevational view of the rear portion of a multi-wheeled vehicle body as cut at the central portion of the body.
Figure 6:
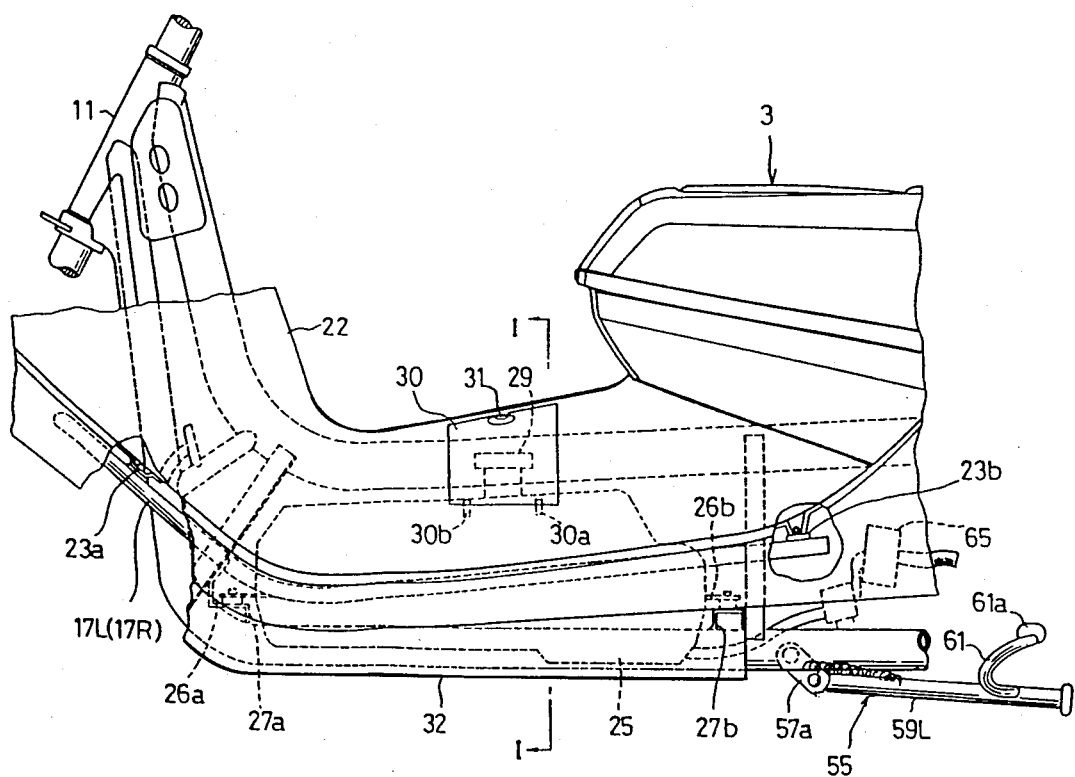
FIG. 6 is a side view of the step floor as partly broken.

As is best seen in FIG. 5, the horizontally extending portions of the main pipe 12 and the down pipes 13L and 13R are arranged in such a manner that three lines connecting the pipes 12, 13L and 13R form a triangle and, in the preferred embodiment, an isosceles triangle having a vertex at the main pipe 12. The frame members 12, 13L and 13R are connected to one another by means of gusset plates 15. A pair of stays 16L and 16R each having a sectional L-shape are projected sidewardly from the gusset plates 15. Longitudinal U-shaped pipes 17L and 17R are fixed by mounting means such as screws through mounting plates 18L and 18R to the stays 16L and 16R. As shown in FIG. 6, the longitudinal U-shaped pipes 17L and 17R extend substantially along the length of the main pipe 12 from a lower position of the head pipe 11 to a lower position of the seat 3 and are clamped into a fixed relationship so as to maintain the spacing thereof.

Referring to FIGS. 2 and 3, a substantially U-shaped seat pipe 19 is connected by welding or the like at its rear ends to the rear inclined portions of the down pipes 13L and 13R, and is supported at a front end portion by support pipes 20a and 20b fixed to the upright rising portions of the down pipes 13L and 13R. The V-shaped seat 3 is placed on the seat pipe 19 and is fixed thereto in such a manner that hooks 3a formed at a rear portion of the seat 3 (see FIG. 8) are engaged with engagement portions 21a and 21b formed on the seat pipe 19. Fixing portion 3b is then connected to the fixing portion 19a of the seat pipe 19.

As shown in FIGS. 3 and 4, the low-slung step floor 7 as previously mentioned is formed by a floor panel 22 extending along the main pipe 12 and the pair of down pipes 13L and 13R. The floor panel 22 has a convex portion 22a at a central portion where the main pipe 12 is positioned. As shown in FIG. 6, the floor panel 22 is bolted to mounting plates 23a and 23b fixed at the front and rear end portions of the longitudinal U-shaped pipes 17L and 17R. Side panels 24L and 24R are provided on both side edges of the floor panel 22 and are bolted at their respective rear end bent portion 24a to the rear end portion of the longitudinal U-shaped pipes 17L and 17R, respectively, as shown in FIG. 4.

Figure 7:
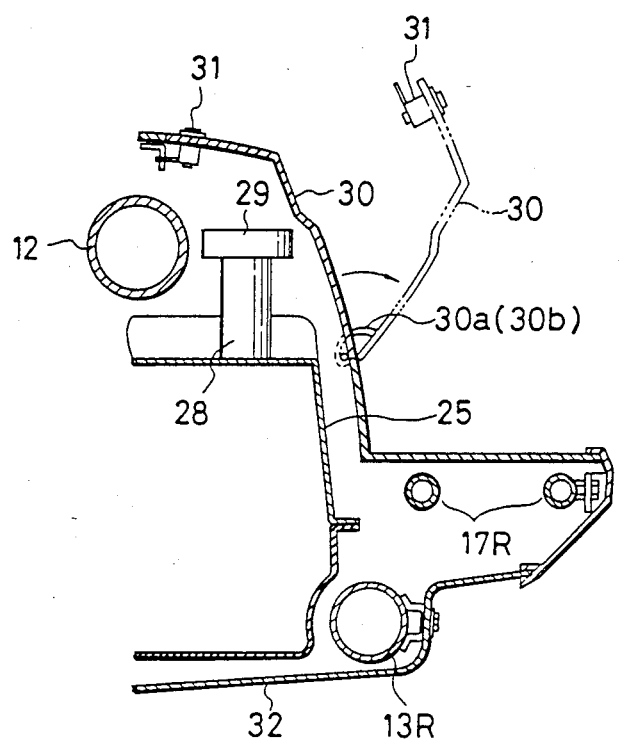
FIG. 7 is a cross-sectional view taken substantially along line I—I in FIG. 6.

Referring to FIGS. 6 and 7, a fuel tank 25 is provided between both the horizontal extending portions of the down pipes 13L and 13R, and is bolted at its mounting stays 26a and 26b projected from front and rear ends thereof to mounting plates 27a and 27b fixedly provided between the pair of down pipes 13L and 13R. The fuel tank 25 is provided with a fuel filler pipe 28 projecting from the upper surface at a right-hand position of the main pipe 12 with respect to a vehicle advancing direction, for example, and the fuel filler pipe 28 is closed by a fuel cap 29 at an opening end. The floor panel 22 is formed with an opening portion at an upper position of the fuel cap 29 for the purpose of supplying fuel to the fuel tank 25, and a lid 30 is openably mounted to the opening portion by means of hinges 30a and 30b. The lid 30 is provided with a key 31 at a central position of a free end thereof. An underguard plate 32 for protecting the fuel tank 25 is provided below the fuel tank 25, and is engaged at both side edges with lower side edges of the side panels 24L and 24R.

Figure 8:
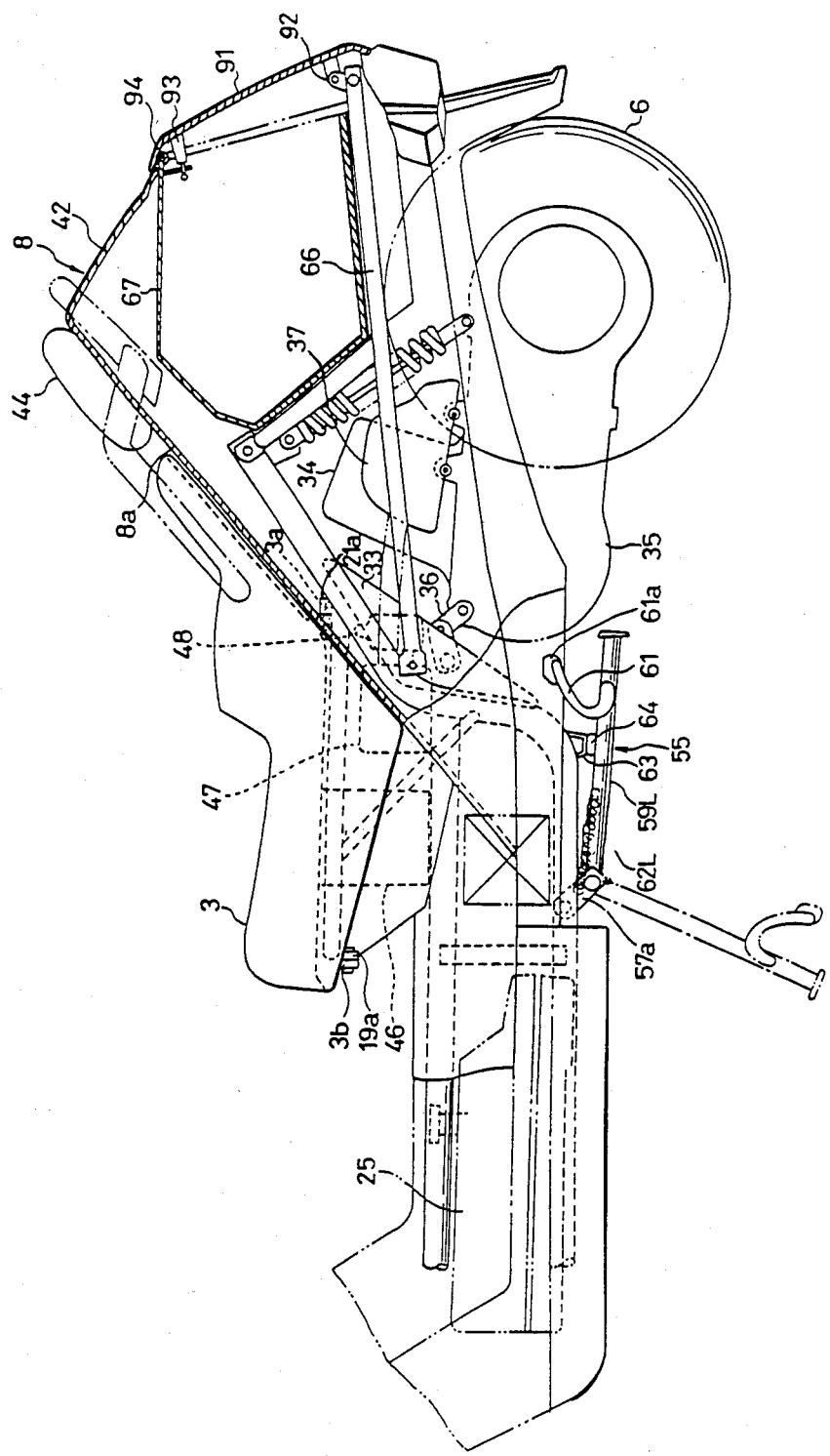
FIG. 8 is an enlarged side view of the rear portion of a multi-wheeled vehicle body in partial cross section.

Referring to FIGS. 2 and 8, triangular gusset plates 33 are welded to the rear rising portions of the pair of down pipes 13L and 13R. A power unit 35 is integrally formed with an engine to transmit the power of the engine 34 to the rear wheel 6. The power unit 35 is swingably mounted at its front end through a link 36 about an axle 36a connected to one of the gusset plates 33. An air cleaner 37 is mounted on the power unit 35. The rear end portion of the power unit 35 is connected to the left side of the rear wheel axle 6a to drive the vehicle in an advancing direction.

As shown in FIG. 4, the right side of the rear axle 6a is connected to a rear end portion of a support plate 38 mounted to the crank case of the engine 34 at a front end portion thereof. A muffler 86 is provided on the outside of the support plate 38. As is apparent from FIG. 4, the rear rising portions of the down pipes 13L and 13R are divergently arranged so that the air cleaner 37 may move sufficiently without hindering the swinging action thereof, and that a sufficient tilt angle of the down pipes 13L and 13R with respect to a vertical plane may be obtained. Further, the capacity of the rear trunk 67 which will be herinafter described may be increased.

A cross member 39 is fixedly provided between the rear end portions of the down pipes 13L and 13R, and a pair of cushion members such as shock absorbers 40L and 40R for supporting the rear wheel 6 are mounted at respective upper ends of the cross member 39 through stays 41a and 41b. The cross member 39 acts to enhance the support strength of the cushion members 40L and 40R to the down pipes 13L and 13R.

Referring to FIGS. 3 and 8, the rear cover 8 has a projection 42 at an upper portion thereof. The projection 42 is formed with a plurality of louvers 43 for discharging heat from the engine 34 on a rear slant surface thereof. With this arrangement, the heat from the engine 34 rises along an upper slant surface of the rear cover 8 to the projection 42, and is sucked out through the louvers 43 by the action of air flow along the rear slant surface during running of the vehicle. Thus, heat may be smoothly discharged from the louvers 43.

A back rest 44 is provided on the front surface of the projection 42. Further, a partition board 8a formed of a heat insulating material is provided on the upper slant surface of the rear cover 8 inclined along the rear edge of the seat 3. The partition board 8a is preferably integrally formed with the rear cover 8 by using heat insulating resin. The provision of the heat insulating partition board 8a on the rear slant surface of the rear cover 8 hinders the engine heat from being transmitted to the seat 3, thereby protecting the seat 3 from the heat, and increasing the seat life.

The rear cover 8 consists of an upper cover 8A for covering a peripheral portion of the engine 34 and an upper portion of the rear wheel 6, and a lower cover 8B for covering the power unit 35, wherein the lower cover 8B may be separated from the upper cover 8A. With this arrangement, in case of maintenance of the power unit 35, for example, it is not necessary to fully remove the rear cover 8 from the body. Rather, it is sufficient to remove the lower cover 8B only, thus improving workability and the ease of vehicle maintenance.

The lower cover 8B is formed with an air inlet 45 opening on the front side for inducing air into the body during running. As shown in FIG. 4, the lower cover 8B is provided with a boss 53 on the inside of a front end portion. The boss 53 engages a mounting hole 54 formed at the rear end portion of the longitudinal U-shaped pipe 17L.

Arranged under the seat 3 are a battery case 46, a chamber 47 supplied with air from the air cleaner 37 through a not-shown tube, and a carburetor 48 communicating with the chamber 47. A lower seat cover 49 surrounds these components. As is apparent from FIG. 3, the convex portion 22a of the floor panel 22 is obliquely cut at a rear end portion, and the lower seat cover 49 is engaged with an obliquely cut portion of the convex portion 22a at a lower end thereof, thereby providing a continuous floor panel 22 and enhancing appearance of the body cover.

Further, since the lower seat cover 49 is connected to the floor panel 22 at a position higher than the floor surface of the floor panel 22, there is no possibility that sand and mud, etc. on the floor surface can enter the juncture between the lower seat cover 49 and the floor panel 22 into the body. The lower seat cover 49 is formed with a plurality of positioning portions 50 and a plurality of fixing portions 51 at a lower edge thereof. As shown in FIG. 5, the fixing portions 51 are bolted to the plurality of fixing portions 52 inwardly projecting from the obliquely cut portion of the projections 22a.

Referring to FIGS. 4, 6 and 8, a main stand 55 is located under the seat 3 between the underguard plate 32 and the power unit 35. As is apparent from FIG. 4, the main stand 55 includes a rotating shaft 58 rotatably mounted through stays 57a and 57b to a cross member 56 fixed between the pair of down pipes 13L and 13R, a pair of legs 59L and 59R fixed to the rotating shaft 58, and a cross member 60 fixed between the pair of legs 59L and 59R. As shown in FIG. 8, the main stand 55 is adapted to swing between an extended in-use position denoted by a dashed line and a retracted (not in-use) position denoted by a solid line. A return spring 62L is provided under tension between the leg 59L and the stay 57a. A stopper 63 abutting against the main stand 55 in the retracted position is provided in the vicinity of the rear rising portions of the down pipes 13L and 13R. A rubber member 64 serving as a cushion material is attached to the abutment surface of the stopper 63. The main stand 55 located between the underguard plate 32 and the power unit 35 also serves as a protection member for protecting auxiliary machinery such as a fuel pump 65 located above the main stand 55, the engine 34 and the frame pipes.

The main stand 55 includes an arm 61 projecting outwardly from the leg 59L. The arm 61 is provided with a pedal 61a at a free end thereof. As shown in FIGS. 3 to 5, when the main stand 55 is in the retracted position, the pedal 61a is positioned on a front side of the air inlet 45 and on the inside of an outer edge of a projecting portion 8b of the rear cover 8. With this arrangement, as the pedal 61a of the arm 61 is retracted at a position below the projecting portion 8b of the rear cover 8 under the retracted condition of the main stand 55, there is no possibility of the pedal 61a obstructing a rider. In extending the main stand 55, a foot F is stepped to the position below the projecting portion 8b of the rear cover 8, and is mounted on the pedal 61a. Therefore, there is no interference by the rear cover 8 in use of the main stand 55.

Figure 9:
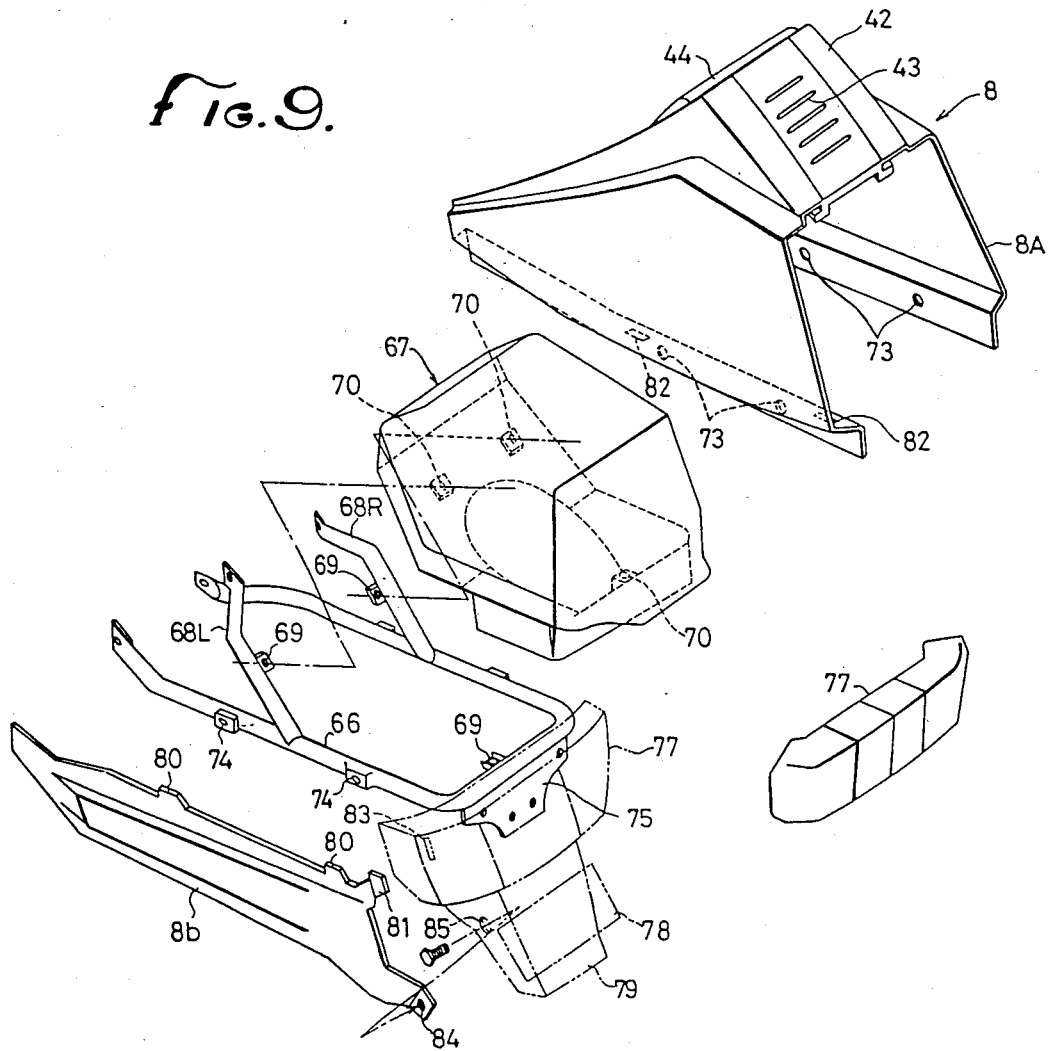
FIG. 9 is an exploded perspective view of a rear portion of a multi-wheeled vehicle body.

Referring to FIGS. 2, 8 and 9, a trunk frame 66 extends from the gusset plates 33 welded to the rear rising portions of the down pipes 13L and 13R. A rear trunk 67 is mounted on the trunk frame 66. As is apparent from FIG. 9, the trunk frame 66 having a substantially U-shaped structure is fixed to the gusset plates 33 at front ends thereof, and is also fixed through support pipes 68L and 68R connected by welding or the like at intermediate portions to the down pipes 13L and 13R. For example, three fixing members 69 are connected to the frame 66 and the support pipes 68L and 68R, and are bolted to three mounting holes 70 provided at bottom portion of the rear trunk 67.

Referring to FIG. 10, the rear trunk 67 consists of an upper case 67U and a lower case 67L. The upper and lower cases 67U and 67L are engaged at respective opening ends, and are formed into an integral structure to define a trunk compartment. A plurality of fixing portions 71U and 71L formed at peripheral edges of the upper and lower cases 67U and 67L are fixed by means such as screws. The upper case 67U is integrally formed with a plurality of lateral ribs 72U on an outer surface thereof, and the lower case 67L is integrally formed with a plurality of longitudinal and lateral ribs 72L on a bottom surface thereof, thereby improving rigidity of the rear trunk 67.

Referring again to FIG. 9, the rear trunk 67 mounted on the trunk frame 66 is surrounded by the upper cover portion 8A of the rear cover 8. The upper cover 8A is connected to the trunk frame 66 by connecting means such as nuts 74 and not-shown bolts. A tail light assembly is mounted to a stay 75 welded to a rear end portion of the trunk frame 66. The tail light assembly includes a tail light 77 and a number guard 79 for mounting a number plate 78 thereon.

The lower cover 8B of the rear cover 8 has two upper projections 80 and an upper rear projection 81, which are engaged with holes 82 formed through the upper cover 8A and a hole 83 formed through the number guard 79, respectively. The lower cover 8B is bolted at a rear end hole 84 to the mounting hole 85 formed through the number guard 79. The front end portion of the lower cover 8B is engaged with the body frame by means of the boss 53 as previously mentioned with reference to FIG. 4.

Figure 13:
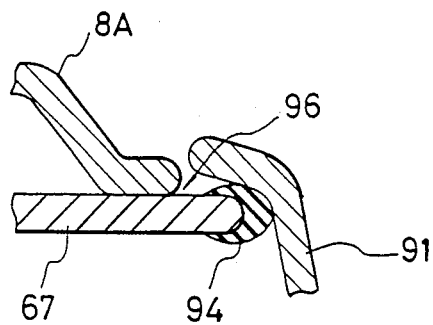
FIG. 13 is an enlarged view of the essential part of FIG. 8.

Referring to FIG. 8, the rear trunk 67 is received in the rear cover 8, and opens to the rear side of the body. An opening edge of the rear trunk 67 is slightly projected from the rear end of the body (rear cover 8). A lid 91 for openably closing the opening of the rear trunk 67 is swingably mounted to the trunk frame 66 by means of hinges 92 at a lower end thereof. The lid 91 is provided with a key 93 at a central position of an upper end portion. A seal member 94 is mounted at the opening edge of the rear trunk 67, and is adapted to abut against the lid 91 under the closed condition, thereby improving water proofing performance of the rear trunk 67. Furthermore, as is apparent from FIG. 13, a groove 96 is defined by the rear edge of the upper cover 8A, the rear trunk 67 and the seal member 94. The groove 96 acts as a guide groove for drainage of rainwater.

As shown in FIG. 4, the rear cover 8 is wider than the step floor 7. An outer wall of the rear trunk 67 received in the rear cover 8 is arranged adjacent to an inner surface of the rear cover 8. With this arrangement, a capacity of the trunk room of the rear trunk 67 may be increased, and the rear trunk 67 may be utilized as a reinforcing member for the rear cover 8, thereby improving rigidity of the rear cover 8 without using any dedicated reinforcing members.

Figure 12:
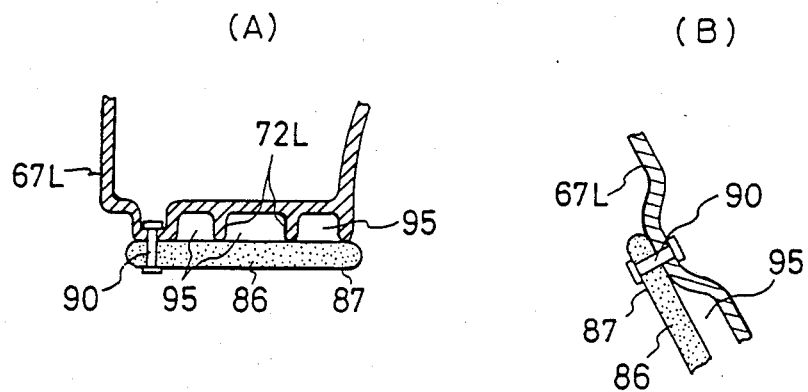
FIGS. 12a and 12b are sectional views taken along the lines II—II and III—III of FIG. 11, respectively.

Referring to FIG. 11, a muffler 86 is located below the rear trunk 67. Heat insulating material 87 is mounted to the bottom plate of the trunk over the muffler 86, so as to insulate heat from the muffler 86. As shown in FIGS. 12A and 12B, the heat insulating material 87 is, for example, formed of glass wool and silver paper covering the glass wool and is fixed to the bottom plate of the trunk by fastening means such as rivets 90. The heat insulating material 87 serves to insulate the heat from the muffler 86 and protect the bottom plate of the trunk. Further, an air layer 95 is formed between the heat insulating material 87 and the bottom plate of the trunk by the provision of the ribs 72L, thereby further improving a heat insulating effect.

For purposes of example, the step floor 7, the rear cover 8, the floor panel 22 and the rear trunk 67 as described above may be made of resin, while the frame members consisting of the main pipe and the two down pipes may be made of steel.

As stated above, the vehicle is provided with a tandem seat. The front portion 3C of the double riding seat 3 which is provided for the front rider is positioned over the low-slung footrest portion 7 of the vehicle. Additionly, the front end portion 3C of the double riding seat 3 is positioned on the lower or front side of a tangent line L2 extending from a grip G of the vehicle steering handle to the forward circumference of the rear wheel 6.

In the aforementioned construction, the longitudinal distance of the main body frame through the low-slung footrest portion is elongated in accordance with the increased distance between the front and rear axles. The main body frame, including the lower main frame members and the upper main frame member defines a large triangular space. The main frame members are connected by the triangular plates and the reinforcing frames. With this structure, the vehicle body may be provided with flexural and torsional rigidity so as to effectively oppose the large bending moment and torsional moment applied to the body frame during operation of the vehicle.

Furthermore, as the distance between the front and rear axles is elongated, the swing-type power unit is sufficiently spaced away from the front wheel. In addition to the above, the location of the fuel tank at the low-slung footrest portion along the left and right lower main frames or down tubes arranged at a level lower than the straight line L1 connecting the front wheel and the rear wheel provides the vehicle with a center of gravity which is more desirably positioned between the front wheel and the rear wheel. Moreover, the fuel tank is protected from external forces by the lower main frame members and the upper main frame member. The triangular steel plate located in the rear portion of the vehicle also functions as a heat shielding plate for the power unit 36.

Additionally, positioning the fuel tank as described hereinabove rather than under the seat permits the torsional moment applied to the main body frame due to the inertial force of the fuel tank during operation to be significantly decreased. As such, the diameter of the main frame members are not needlessly increased, thereby decreasing the additional weight of the vehicle body while still providing the desired vehicle body high strength and rigidity.

As will also be understood by those skilled in the art, the appropriate positioning of the fuel tank also permits the level of the seat to be lowered such that the center of gravity of the rider is also lowered. This lowering center of gravity also reduced the torsional moment applied to the main body frame due to the weight of the operator during riding. Furthermore, the seat 3 may be located in such a manner that the seat front end portion 3C is arranged over the footrest plates and still positioned on the lower or front side of a tangent line L2 extending between a grip G of the steering handle and the front circumference of the rear wheel 6 as viewed in the side elevation. Moreover, where the seat 3 is a tandem seat, the rear rider seat portion 3d may also be advantageously positioned in front of a vertical line L3 passing through the rear axle 6a. Thus, regardless of whether one or two passengers occupy the vehicle, the vehicle center of gravity is not excessively offset towards the rear wheel side, thereby providing greater stability and desirable weight distribution to the front wheel of the vehicle.

Lastly, the space defined just under the seat S may be utilized as a space for maintaining vehicle components such as a battery or as a glove box.

Furthermore, as will be understood to those skilled in the art, the engine of the vehicle may be advantageously arranged such that a cylinder of the engine is vertically aligned below the seat 3. The cylinder may be aligned either below the forward seat or the rear portion of a stepped tandem seat, such as that illustrated in the figures. Moreover, as the engine is also mounted low, it will be known to those skilled in the art that the engine will be mounted substantially at the same level as the fuel tank.

As is described above, in the arrangement of the main stand in the scooter type vehicle according to the present invention, the pedal mounted to the arm of the main stand is located at a position inside the outer edge of the rear cover when the main stand is in the retracted position. In other words, when the main stand is not used, the pedal is retracted at a position below the projecting portion of the rear cover. Accordingly, there is no possibility of the pedal obstructing a rider and damaging appearance of the body. Further, since the air inlet of the rear cover is utilized for the location of the pedal, a rider's foot may be easily inserted into the recessed portion of the air inlet in using the pedal.

What is claimed is:

1. A multi-wheeled vehicle having longitudinally spaced front and rear axles, a front and rear wheel rotably mounted to said axles, and a steering mechanism operably connecting said front wheel and having at least one handle, comprising:
 a body frame structure including a head pipe mounting said steering mechanism and structural members extending downwardly and rearwardly from said head pipe below the level of a first reference line extending between said front and rear axles;
 a power unit including an engine drivingly connecting said rear wheel being substantially coincident with said first reference line and having one end pivotally connecting said body frame structure and the other end rotably mounting said rear wheel;
 a fuel tank mounted on said body frame structure below the level of said first reference line intermediate said front and rear wheels in longitudinal alignment therewith; and
 a seat mounted on said body frame structure above said first reference line, said seat extending forwardly of a second reference line extending between said steering mechanism handle and the tangent to the front circumferential face of said rear wheel.

2. A multi-wheeled vehicle as set forth in claim 1 wherein said body frame structure includes a main pipe overlying said fuel tank and a pair of down pipes spaced laterally outwardly from said fuel tank.

3. A multi-wheeled vehicle as set forth in claim 2 wherein said main pipe and said down pipes have their central axes disposed on triangular spacing.

4. A multi-wheeled vehicle as set forth in claim 1 wherein said seat is a tandem seat providing space for a rider and a passenger and said passenger seat is located in front of a vertical line passing through the rear axle.

5. A multi-wheeled vehicle as set forth in claim 4 wherein said engine includes a cylinder aligned in the substantially vertical direction and said cylinder is arranged below said seat.

6. A multi-wheeled vehicle as set forth in claim 4 wherein said seat is a stepped tandem seat and said vertical cylinder is arranged below the passenger portion of said seat.

* * * * *